(12) United States Patent
Wang et al.

(10) Patent No.: US 11,075,961 B2
(45) Date of Patent: Jul. 27, 2021

(54) MESSAGE PROCESSING METHOD, APPARATUS, SYSTEM, AND COMPUTER STORAGE MEDIUM

(71) Applicant: TENCENT TECHNOLOGY (SHENZHEN) COMPANY LIMITED, Guangdong (CN)

(72) Inventors: Zhaotian Wang, Shenzhen (CN); Jinlong Shen, Shenzhen (CN); Yutao Li, Shenzhen (CN); Zhenquan Wu, Shenzhen (CN); Yu Miao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

(21) Appl. No.: 15/757,443

(22) PCT Filed: Jan. 22, 2017

(86) PCT No.: PCT/CN2017/072113
§ 371 (c)(1),
(2) Date: Mar. 5, 2018

(87) PCT Pub. No.: WO2017/129083
PCT Pub. Date: Aug. 3, 2017

(65) Prior Publication Data
US 2018/0359288 A1 Dec. 13, 2018

(30) Foreign Application Priority Data
Jan. 29, 2016 (CN) .......................... 201610066682.5

(51) Int. Cl.
*G06Q 30/00* (2012.01)
*G06Q 30/02* (2012.01)
(Continued)

(52) U.S. Cl.
CPC ..... *H04L 65/1069* (2013.01); *G06Q 30/0207* (2013.01); *G06Q 50/01* (2013.01);
(Continued)

(58) Field of Classification Search
CPC ... H04L 65/1069; H04L 51/32; H04L 51/046; H04L 63/083; H04L 51/18; H04L 63/104;
(Continued)

(56) References Cited

U.S. PATENT DOCUMENTS 6,336,099 B1 * 1/2002 Barnett ............... G06Q 20/108
705/14.35
6,862,575 B1 * 3/2005 Anttila .................. G06Q 30/02
705/14.14
(Continued)

FOREIGN PATENT DOCUMENTS

| CN | 103635923 A | 3/2014 |
| CN | 104851041 A | 8/2015 |

(Continued)

OTHER PUBLICATIONS

International Search Report of PCT/CN2017/072113 dated Apr. 12, 2017.
(Continued)

*Primary Examiner* — Kevin T Bates
*Assistant Examiner* — Golam Mahmud
(74) *Attorney, Agent, or Firm* — Sughrue Mion, PLLC

(57) ABSTRACT

A message processing method, apparatus, and system, which include: receiving a sharing request for a source message and sent by a terminal, the source message carrying a password and an enterprise account identifier, the sharing request including a sharing user account identifier; returning at least one account identifier to the terminal, and receiving a determined target account identifier with which the source message is shared and that is selected by the terminal; setting (Continued)

an electronic resource property for the source message according to a preset rule to generate a target message, sending the target message to a target user corresponding to the target account identifier; and transferring, according to the electronic resource property, an electronic resource corresponding to an associated account of the enterprise account identifier to an associated account of the sharing user account identifier if receiving a drawing request sent by the terminal and that carries the password.

18 Claims, 8 Drawing Sheets

(51) Int. Cl.
*H04L 29/06* (2006.01)
*H04L 12/58* (2006.01)
*G06Q 50/00* (2012.01)
(52) U.S. Cl.
CPC ............ *H04L 51/046* (2013.01); *H04L 51/18* (2013.01); *H04L 51/32* (2013.01); *H04L 63/083* (2013.01); *H04L 63/104* (2013.01)
(58) Field of Classification Search
CPC ..... H04L 51/04; H04L 51/08; G06Q 30/0207; G06Q 50/01; G06Q 20/065; G06Q 20/108
USPC ......................................................... 709/223
See application file for complete search history.

(56) References Cited

U.S. PATENT DOCUMENTS

| | | | | |
|---|---|---|---|---|
| 7,979,057 B2* | 7/2011 | Ortiz | ................... | G06Q 20/401 |
| | | | | 455/414.1 |
| 8,239,261 B2* | 8/2012 | Redford | ............. | G06Q 30/0225 |
| | | | | 705/14.22 |
| 8,775,243 B2* | 7/2014 | Gillenson | .......... | G06Q 30/0231 |
| | | | | 705/14.15 |
| 9,559,992 B2* | 1/2017 | Zhang | ..................... | H04L 51/10 |
| 9,892,419 B1* | 2/2018 | Grossman | .......... | G06Q 30/0225 |
| 10,210,491 B2* | 2/2019 | Zhang | .............. | G06Q 20/38215 |
| 10,282,477 B2* | 5/2019 | Chen | .................... | G06F 16/9537 |
| 10,699,301 B2* | 6/2020 | Zheng | ................... | G06F 16/906 |
| 2010/0036772 A1* | 2/2010 | Arceneaux | ........... | G06Q 20/045 |
| | | | | 705/50 |
| 2012/0209686 A1* | 8/2012 | Horowitz | ............. | G06K 7/1417 |
| | | | | 705/14.26 |
| 2013/0006738 A1 | 1/2013 | Horvitz et al. | | |
| 2014/0289041 A1 | 9/2014 | Fujii | | |
| 2015/0039409 A1 | 2/2015 | Marsico et al. | | |
| 2015/0149272 A1* | 5/2015 | Salmon | .............. | G06Q 30/0233 |
| | | | | 705/14.33 |
| 2015/0371283 A1* | 12/2015 | Chevrier | ............ | G06Q 30/0269 |
| | | | | 705/14.66 |
| 2017/0103408 A1* | 4/2017 | Mazuera | ............... | H04L 63/102 |

FOREIGN PATENT DOCUMENTS

| | | |
|---|---|---|
| CN | 105096137 A | 11/2015 |
| CN | 105530175 A | 4/2016 |
| JP | 2014-186539 A | 10/2014 |
| JP | 2014-529110 A | 10/2014 |
| KR | 10-2014-0035980 A | 3/2014 |
| KR | 10-2014-0063256 A | 5/2014 |

OTHER PUBLICATIONS

Communication dated Jul. 29, 2019, from the Japanese Patent Office in counterpart Application No. 2018-536784.
Written Opinion in International Application No. PCT/CN2017/072113, dated Apr. 12, 2017.
"Marketing Research", Apr. 25, 2015, pp. 8-10 (total 3 pages).
Communication dated Jun. 27, 2019 from the State Intellectual Property Office of the P.R.C. in counterpart Application No. 201610066682.5.
Office Action dated Jan. 17, 2020 in Korean Application No. 10-2018-7020328.
Communication dated May 22, 2020, from the Intellectual Property Office of India in Application No. 201847023921.

* cited by examiner

MESSAGE PROCESSING METHOD, APPARATUS, SYSTEM, AND COMPUTER STORAGE MEDIUM

CROSS-REFERENCE TO RELATED APPLICATION

This application is a U.S. national stage application under 35 U.S.C. § 371 of International Application No. PCT/CN2017/072113, filed on Jan. 22, 2017, in the Chinese Patent Office, which claims priority from Chinese Patent Application No 201610066682.5, entitled "MESSAGE PROCESSING METHOD, APPARATUS, AND SYSTEM, AND COMPUTER STORAGE MEDIUM," filed on Jan. 29, 2016, in the Chinese Patent Office, the disclosures of which are incorporated herein by reference in their entireties.

BACKGROUND

1. Field

This application relates to methods and apparatuses consistent with example embodiments related to message processing technologies in Internet applications, and particularly, to a message processing method, apparatus, and system, and a computer storage medium.

2. Description of Related Art

With the development of Internet technologies, functions of various Internet applications become richer. Currently, the red packet function is a feature service provided by most Internet applications, and particularly, during festivals or holidays, the red packet function of the Internet applications is widely applied. The red packet function is mainly based on the transfer of red packet messages between users of the Internet applications. The red packet message herein is a message that has a blessing function and that can be propagated by means of the Internet. Currently, an implementation process of the red packet function of the Internet applications is relatively simple. That is, a provider sends a red packet message, and a receiver receives the red packet message and draws an electronic resource (electronic money) described by the red packet message. The existing technology has at least several problems. First, there is a lack of diversity in a manner of propagating the red packet message. Secondly, the propagation power of the red packet message is relatively weak. Thirdly, the propagation range is relatively small.

SUMMARY

According to example embodiments, there is provided a message processing method, apparatus, and system, and a computer storage medium, so as to improve propagation power of a red packet message, expand a propagation range of the red packet message, enrich a message processing function, and enable a message processing process to be more practical and effective.

According to example embodiments, there is provided a message processing method, the method including receiving a sharing request that is for a source message and that is sent by a terminal, the source message carrying a password and an enterprise account identifier, and the sharing request including a sharing user account identifier; returning at least one account identifier in an Internet application to which the enterprise account identifier belongs to the terminal, and receiving a determined target account identifier with which the source message is shared and that is selected by the terminal from the at least one account identifier; setting an electronic resource property for the source message according to a preset rule to generate a target message, and sending the target message to a target user corresponding to the target account identifier, the electronic resource property including a total amount of an electronic resource and a number of time of drawing the electronic resource; and transferring, according to the electronic resource property, an electronic resource corresponding to an associated account of the enterprise account identifier to an associated account of the sharing user account identifier if receiving a drawing request that is sent by the terminal and that carries the password.

According to example embodiments, there is provided another message processing method, the method including sending a sharing request for a source message to a server when detecting a trigger operation of a sharing user on the source message, the source message carrying a password and an enterprise account identifier, and the sharing request including a sharing user account identifier; receiving at least one account identifier that is returned by the server and that is in an Internet application to which the enterprise account identifier belongs; selecting a determined target account identifier with which the source message is shared from the at least one account identifier, so that the server sets an electronic resource property for the source message according to the preset rule to generate a target message, and sends the target message to a target user corresponding to the target account identifier, the electronic resource property including a total amount of an electronic resource and a number of time of drawing the electronic resource; and sending a drawing request carrying the password to the server if receiving a drawing operation of the sharing user on the target message, so that the server transfers, according to the electronic resource property, an electronic resource corresponding to an associated account of the enterprise account identifier to an associated account of the sharing user account identifier.

According to example embodiments, there is provided a message processing apparatus, the apparatus including a request receiving unit, configured to receive a sharing request that is for a source message and that is sent by a terminal, the source message carrying a password and an enterprise account identifier, and the sharing request including a sharing user account identifier; an identifier returning unit, configured to return at least one account identifier in an Internet application to which the enterprise account identifier belongs to the terminal; a target determining unit, configured to receive a determined target account identifier with which the source message is shared and that is selected by the terminal from the at least one account identifier; a setting unit, configured to set an electronic resource property for the source message according to a preset rule to generate a target message, the electronic resource property including a total amount of an electronic resource and a number of time of drawing the electronic resource; a message sharing unit, configured to send the target message to a target user corresponding to the target account identifier; and a resource processing unit, configured to transfer, according to the electronic resource property, an electronic resource corresponding to an associated account of the enterprise account identifier to an associated account of the sharing user account identifier if receiving a drawing request that is sent by the terminal and that carries the password.

According to example embodiments, there is provided another message processing apparatus, the apparatus including a sharing request unit, configured to send a sharing request for a source message to a server when detecting a trigger operation of a sharing user on the source message, the source message carrying a password and an enterprise account identifier, and the sharing request including a sharing user account identifier; an identifier receiving unit, configured to receive at least one account identifier that is in an Internet application to which the enterprise account identifier belongs and that is returned by the server; a target determining unit, configured to select a determined target account identifier with which the source message is shared from the at least one account identifier, so that the server sets an electronic resource property for the source message according to the preset rule to generate a target message, and sends the target message to a target user corresponding to the target account identifier, the electronic resource property including a total amount of an electronic resource and a number of time of drawing the electronic resource; and a drawing request unit, configured to send a drawing request carrying the password to the server if receiving a drawing operation of the sharing user on the target message, so that the server transfers, according to the electronic resource property, an electronic resource corresponding to an associated account of the enterprise account identifier to an associated account of the sharing user account identifier.

According to example embodiments, there is provided a message processing system, the system including a server and at least one terminal. The server includes the message processing apparatus, and the terminal includes the message processing apparatus.

According to example embodiments, there is a provided a computer storage medium storing program code including instructions for causing a computer to perform the foregoing message processing method.

According to example embodiments, the server may return, according to a sharing request that is for a source message and that is sent by the terminal, at least one account identifier in an Internet application to the terminal. In addition, the server may set an electronic resource property for the source message according to a preset rule to generate a target message, and send the target message to a target user corresponding to a determined target account identifier with which the source message is shared and that is selected by the terminal. If receiving a drawing request that is sent by the terminal and that carries the password, the server can transfer, according to the electronic resource property, an electronic resource corresponding to an associated account of the enterprise account identifier to an associated account of the sharing user account identifier. A red packet message carrying password is shared, transferred, and the like, so as to effectively improve propagation power of the red packet message and expand a propagation range of the red packet message, thereby implementing interaction between an enterprise user and more individual users, enriching functions of a message processing process, and enabling the message processing process to be more practical and effective.

DESCRIPTION OF EXAMPLE EMBODIMENTS

The technical solutions in the example embodiments of this application are clearly described below with reference to the accompanying drawings in the embodiments of this application. It should be understood that, the preferred embodiments described below are merely for describing and explaining this application, but not for limiting this application.

In example embodiments of this application, a server may return, according to a sharing request that is for a source message and that is sent by a terminal, at least one account identifier in an Internet application to the terminal. In addition, the server may set an electronic resource property for the source message according to a preset rule to generate a target message, and send the target message to a target user corresponding to a determined target account identifier with which the source message is shared and that is selected by the terminal. If receiving a drawing request that is sent by the terminal and that carries the password, the server can transfer, according to the electronic resource property, an electronic resource corresponding to an associated account of the enterprise account identifier to an associated account of the sharing user account identifier. A red packet message carrying a password is shared, transferred, and the like, so as to effectively improve propagation power of the red packet message and expand a propagation range of the red packet message, thereby implementing interaction between an enterprise user and more individual users, enriching functions of a message processing process, and enabling the message processing process to be more practical and interesting.

Figure 1:
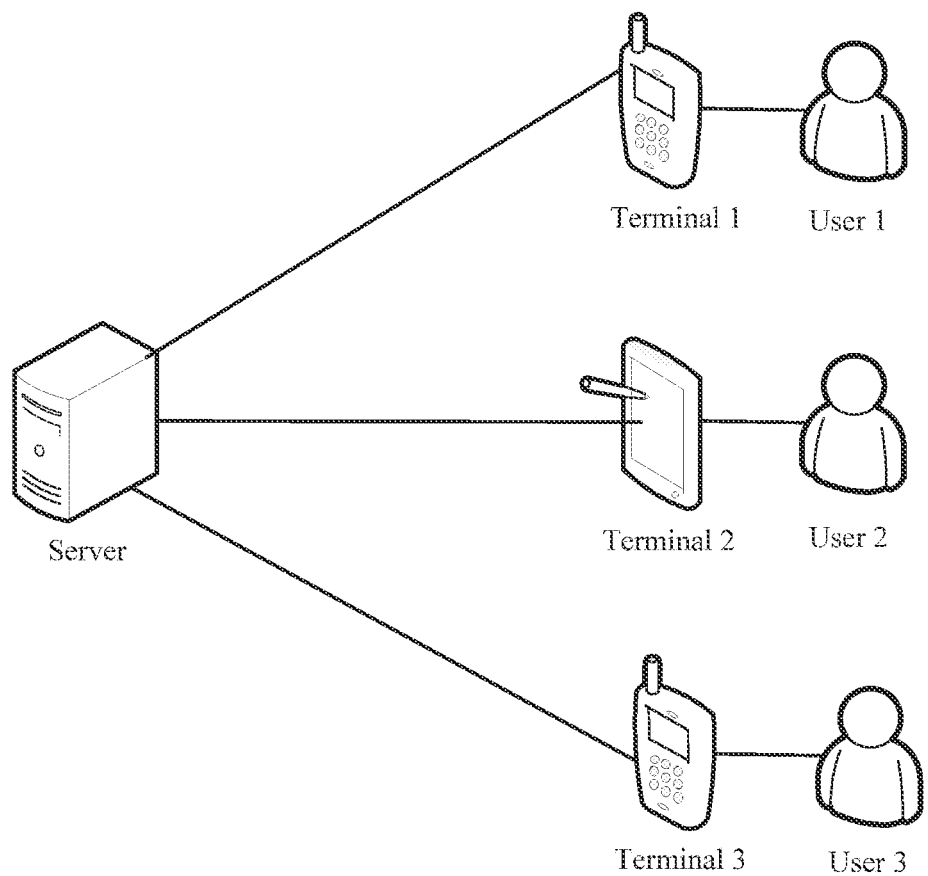
FIG. 1 is a schematic structural diagram of a message processing system according to example embodiments.

Based on the foregoing principle, example embodiments of this application provides a message processing system. The system may be an Internet application system such as an instant messaging application system or a social networking service (SNS) application system. FIG. 1 is an architecture of the message processing system including at least a server and at least one terminal accessing the server.

The terminal may be a device such as a notebook computer, a mobile phone, a tablet computer (PAD), a vehicle terminal, or an intelligent wearable device. At least one type of Internet application may be nm on the terminal. The Internet application includes but is not limited to an instant messaging application, an SNS application, and the like. A user may use the Internet application by means of the terminal. For example, the user may register, by means of the terminal, in the Internet application to obtain an account identifier; or the user may configure personal data such as age, hobby, and consumption habit in the Internet application by means of the terminal; or the user may interact with another user of the Internet application by means of the terminal. The server may be an independent service device on the Internet, or may be a cluster service device consisting of a plurality of independent service devices on the Internet. The server may be configured to process various requirements in a process in which the Internet application implements functions such as user registration, data configuration, and information interaction. In addition, the server may be configured to manage related data of a user in the Internet application and interaction messages between users. The related information of a user may include, but is not limited to, an account identifier, a password, a relationship chain, and the like.

In an Internet application, a user corresponds to an only account identifier, and the user in the Internet application may be an enterprise user or an individual user. Currently, most Internet applications support the red packet function, and not only enable an enterprise user to send a red packet message to an individual user, but also enable individual users to send red packet messages to each other. A red packet is a package body of money and/or a gift. This package body may be an entity package body, for example, an entity package hag packaging cash or a gift coupon. The package body may alternatively be a virtual package body, for example, an electronic package body packaging an electronic gift such as electronic money/electronic gift coupon. For example, a user A gives electronic money with an amount to a user B as a gift in a form f a red packet by means of a social account. The red packet may also be referred to as a gift packet. The gift packet includes cash, a gift coupon, or the like. The red packet message is a message describing a red packet. The red packet message is a message that has a blessing function and that can be propagated by means of the Internet. The red packet message may include but is not limited to a text message and/or an audio or video message. A red packet message generally includes an electronic property. The electronic resource herein may also be referred to as electronic money, and is a type of money that is stored in an electronic account, that is different from paper money, and that can be transmitted and used on the Internet, where the electronic account may include but is not limited to an electronic bank account, an electronic financial account, an electronic credit account, and the like. The electronic resource property included in the red packet message includes a total amount of an electronic resource and a number of time of drawing the electronic resource. For example, an electronic resource property of a red packet message describes that a total amount of an electronic resource is RMB10, and a number of time of drawing the electronic resource is 10. Then, it indicates that, for the red packet message, receiving of a drawing request for the electronic resource for 10 times may be allowed, and a total amount of the drawn electronic resource is RMB10. Further, the electronic resource property included in the red packet message may further include an amount splitting manner. Based on the foregoing example, it is assumed that amount splitting manner is average splitting, and for the red packet message, a sub amount of an electronic resource that is allowed to be drawn for each time is RMB1. Alternatively, it is assumed that the amount splitting manner is random splitting, and for the red packet message, the total amount RMB10 of the electronic resource is randomly split into 10 sub amounts, and the electronic resource is separately drawn for 10 times.

Currently, an implementation architecture of the red packet function of Internet applications relates only to a provider and a receiver of a red packet message. Using that an enterprise user sends a red packet message to an individual user as an example, the enterprise user provides a target message, where the target message includes an electronic resource property; after the target message is transmitted to a target user, the target user can request to draw an electronic resource only by clicking the target message; and then the corresponding electronic resources is transferred from an associated account of the enterprise user (provider) to an associated account of the target user (receiver). Currently, there is a lack of diversity in a manner of propagating the red packet message, and propagation power of the red packet message is relatively weak. A sharer is added, based on the existing art, to an implementation architecture of the red packet function described in this embodiment of this application. In addition, elements such as a password and message sharing are added to an implementation process of the red packet function, so as to improve propagation power of a red packet message, expand a propagation range of the red packet message, and enable a message processing process to be more practical and interesting. Specifically, using that an enterprise user sends a red packet message to an individual user as an example, the enterprise user (provider) provides a source message, where the source message has a password and does not have an electronic resource property; after obtaining the source message, a sharing user (sharer) cannot directly draw an electronic resource, and needs to initiate a sharing operation on the source message, so that the source message has an electronic resource property and becomes a target message; and after the sharing user shares the target message with a target user, both the sharing user and the target user can draw the electronic resource from the target message, and in a drawing process, the sharing user or the target user needs to provide the password, so that the corresponding electronic resource is transferred from an associated account of the enterprise user (provider) to an associated account of the sharing user (sharer) or the target user (receiver). In this embodiment of this application, the red packet message carrying the password is shared, transferred, and the like, so as to effectively improve propagation power of the red packet message and expand a propagation range of the red packet message, thereby implementing interaction between the enterprise user and more individual users, enriching functions of a message processing process, and enabling the message processing process to be more practical and interesting. Unless otherwise specified, in subsequent embodiments of this application, the source message means a red packet message provided by an enterprise user, and the target message is a source message in which an electronic resource property is set.

Figure 2A:
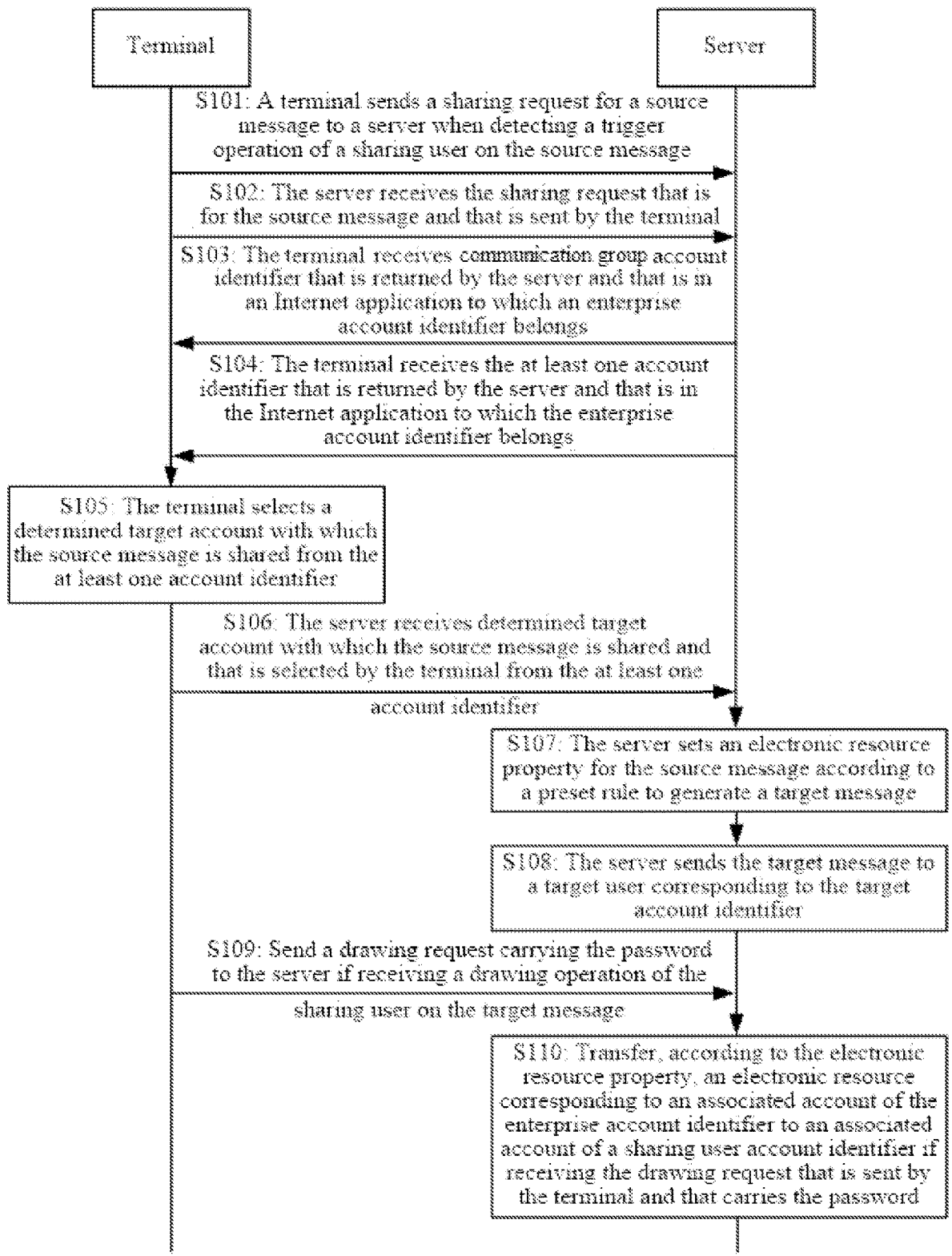
FIGS. 2A-2E are flowcharts of a message processing method according to example embodiments.
Figure 2B:
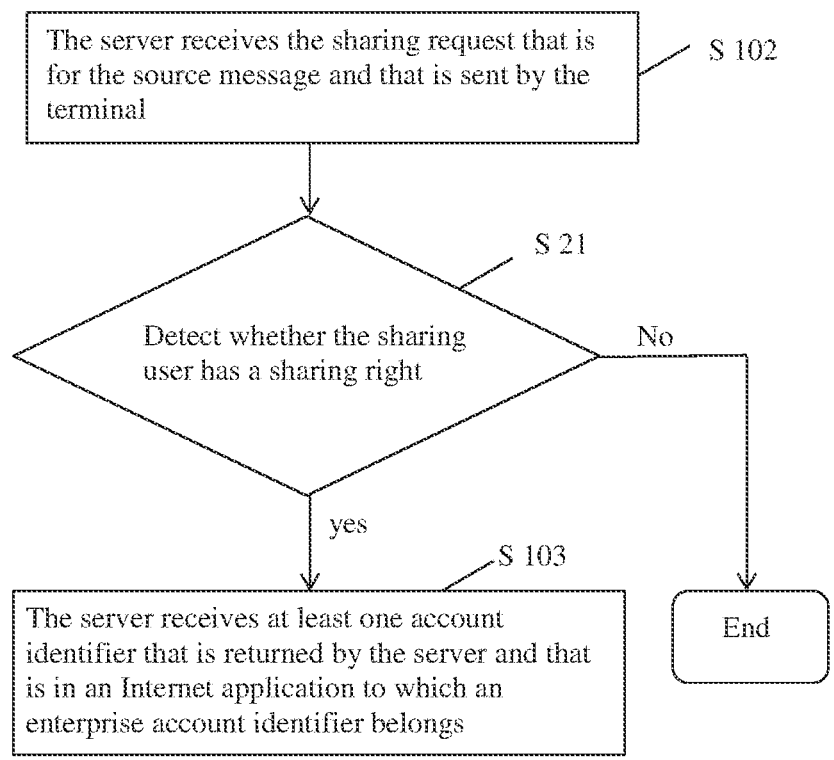
Figure 2C:
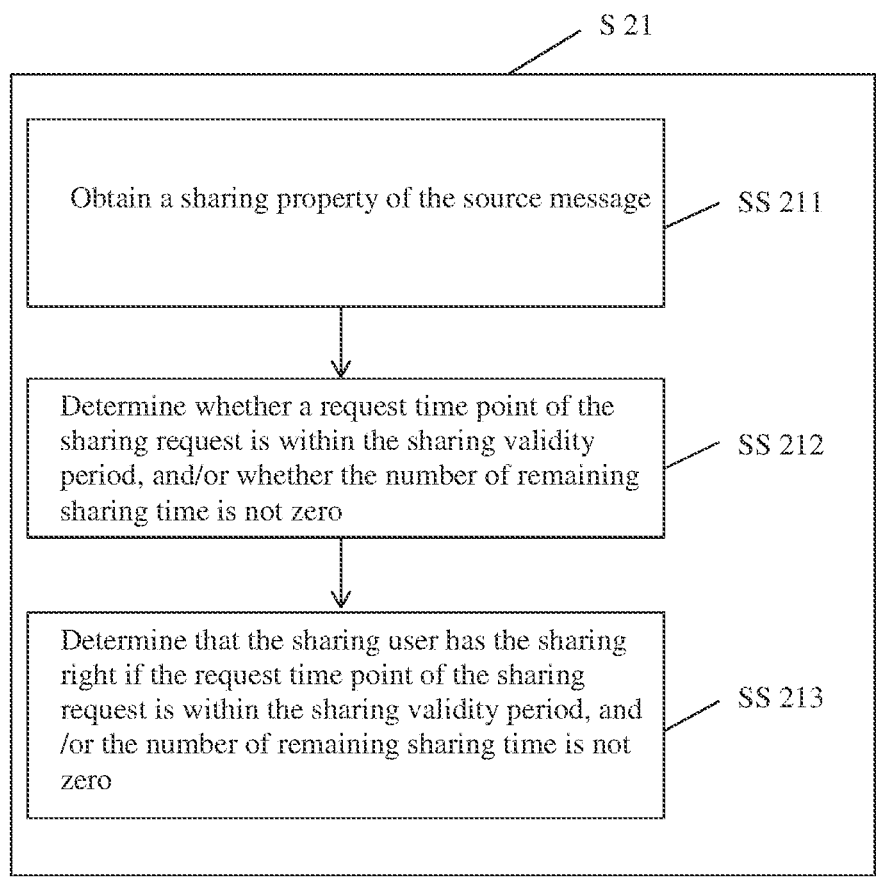
Figure 2D:
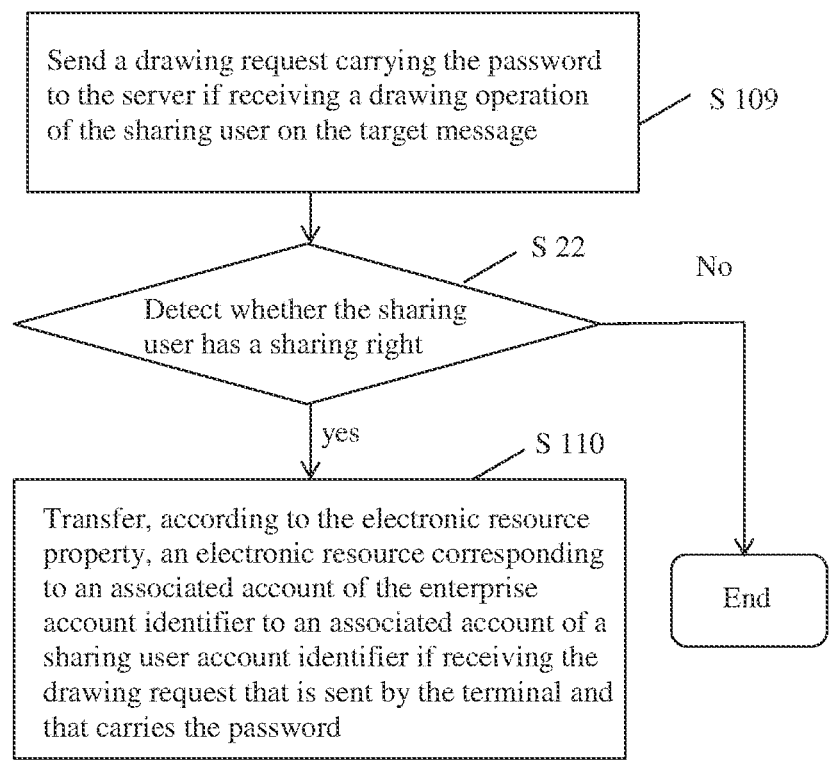
Figure 2E:
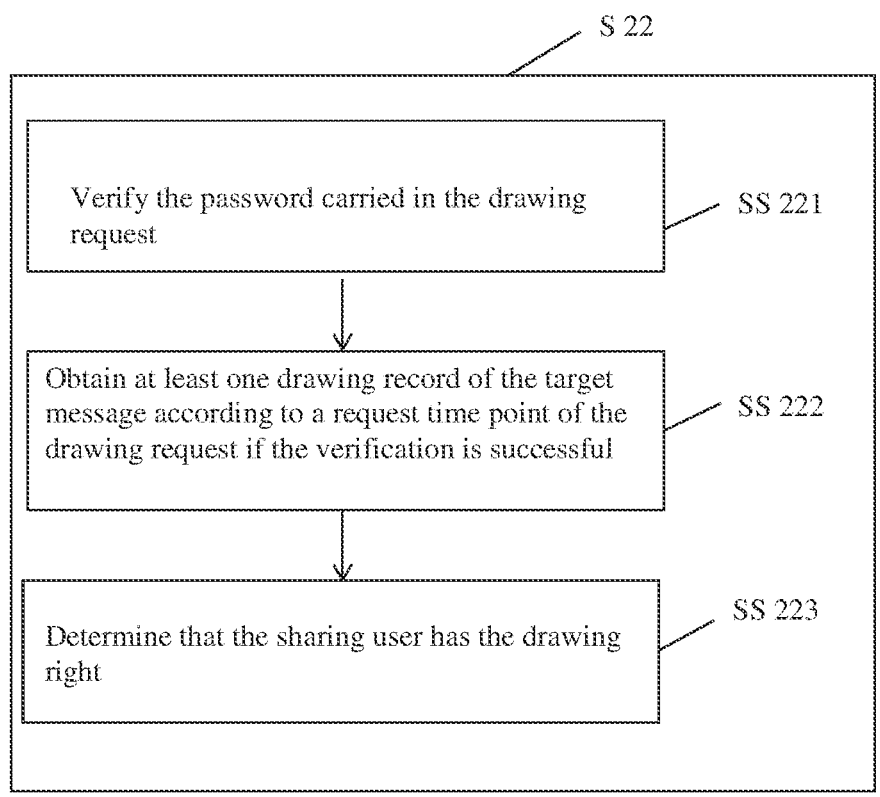

Based on the foregoing descriptions, example embodiments of this application further provide a message processing method. FIG. 2A, may include the following steps S101 to S110. Steps S101, S104 to S105, and S109 may be specifically performed by any terminal shown in FIG. 1, and steps S102 to S103, S106 to S108, and step S110 may be specifically performed by the server shown in FIG. 1. In Step S101, the terminal sends a sharing request for a source message to the server when detecting a trigger operation of a sharing user on the source message, the source message carrying a password and an enterprise account identifier, and the sharing request including a sharing user account identifier.

In some example embodiments, before performing step S101, the terminal further performs the following step:

In Step S101, the terminal obtains the source message when detecting a two-dimensional barcode scanning event and/or a gravity sensing event.

An enterprise user such as a vendor or a service provider may register in an Internet application to obtain an enterprise account identifier, and may configure related data of the enterprise user. The configuration includes: configuration of an enterprise name and identifier LOGO and configuration of an associated account of the enterprise account identifier.

If the enterprise user wants to perform enterprise promotion in the Internet application, express blessing to another user in the Internet application, or interact with another user in the Internet application by using a red packet message, the enterprise user may customize a source message in the Internet application. The customization includes but is not limited to customization of a password carried in the source message. Content of the password may be a promotion slogan, a blessing slogan, or an interaction text, for example, "XX enterprise wishes you a happy new year!", or "XXX enterprise extends greetings to you!". Another customized property of the source message includes but is not limited to: a validity period of the source message; a number of time for which the source message can be shared; a dimension such as an age period, a region, an income range of a user to whom the source message is expected to be pushed; or expectation of pushing the source message to a user who is a sports fan, a travel enthusiast, a shopping lover, or the like; and the like. The server may bind the customized information of the enterprise user with the enterprise account identifier and store the customized information, so that the customized information of the enterprise user may be found according to the enterprise account identifier.

The server generates the source message according to the customized information of the enterprise user, and lay push the source message to a user in the Internet application in a plurality of manners, for example, release the source message in a service page such as a website or a bulletin board system on the Internet by means of a two-dimensional barcode, shaking, and the like, so that the user can obtain the source message by means of operations such as two-dimensional barcode scanning and/or shaking. When the sharing user performs two-dimensional barcode scanning and/or shaking by using the terminal, the terminal detects a two-dimensional barcode scanning event and/or a gravity sensing event so as to obtain the source message provided by the enterprise user.

The terminal may display the source message provided by the enterprise user on an interface of the Internet application, for example, display the source message on a master session in of an instant messaging application. When the sharing user clicks the source: message and generates a trigger operation for the source message, the terminal obtains an account identifier of the sharing user, generates a sharing request for the source message, and sends the sharing request to the server.

In Step S102, the server receives the sharing request that is for the source message and that is sent by the terminal. The server can obtain the account identifier of the sharing user by parsing the sharing request, and can obtain the password and the enterprise account identifier from the source message, so as to learn the enterprise user who provides the source message carrying the password and the sharing user who will transfer and share the source message.

In some example embodiments, after performing step S102 and before performing step S103, the server may perform the following steps as shown in FIGS. 2B-2E:

In step s21, detect whether the sharing user has a sharing right; and perform step S103 if the sharing user has the sharing right.

If the sharing user has the sharing right, a sharing operation on the source message can be initiated; or if the sharing user does not have sharing right, a sharing operation on the source message cannot be initiated. In actual application, in a process of performing step s21, the server specifically performs the following steps:

In step ss211, obtain a sharing property of the source message, the sharing property including a sharing validity period and/or a number of remaining sharing time.

The sharing property of the source message is generated by the server according to the customized information of the enterprise user for the source message, and is bound to the enterprise account identifier and stored. Therefore, in step ss211, the server may search, by using the enterprise account identifier carried in the source message, storage space of the local terminal for the sharing property of the source message that is bound to the enterprise account identifier and stored. The sharing validity period is used to describe a valid sharing time period of the source message. The source message can only be shared in the valid sharing time period described by the sharing validity period. The number of remaining sharing time is used to describe a threshold of a number of time for which the source message can be shared. If the number of remaining sharing time is zero, it indicates that the source message cannot be shared again; or if the number of remaining sharing time is not zero, it indicates that the source message can be shared.

In step ss212, determine whether a request time point of the sharing request is within the sharing validity period, and/or determine whether the number of remaining sharing time is not zero.

In step ss213, determine that the sharing user has the sharing right if the request time point of the sharing request is within the sharing validity period, and/or the number of remaining sharing time is not zero.

When receiving the sharing request that is for the source message and that is sent by the terminal, the server may record a system time of a receiving time point, and records the system time of the receiving time point as a request time point of the sharing request. In steps ss212 to ss213, the server needs to determine whether the request time point of the sharing request is within the valid sharing time period described by the sharing validity period, and/or needs to determine whether the number of remaining sharing time is not zero. If the request time point of the sharing request is within the valid sharing time period described by the sharing validity period, and/or the number of remaining sharing time is not zero, the server may determine that the sharing user has the sharing right. On the contrary, if the request time point of the sharing request is beyond the valid sharing time period described by the sharing validity period, or the number of remaining sharing time is zero, the server may determine that the sharing user does not have the sharing right. In this case, the server may feed sharing failure notification information back to the terminal.

In step S103, receive at least one account identifier that is returned by the server and that is in an Internet application to which the enterprise account identifier belongs.

The server is responsible for managing various account identifiers in the Internet application, including an enterprise user account identifier, an individual user account identifier, and a communication group account identifier. The communication group refers to a cluster that is created by any user in the Internet application, that includes two or more users, and that can implement communication and session between two or more users and exchanging between the users. The users of the communication group are also referred to as member users of the communication group. One communication group corresponds to only one communication group account identifier, and one communication group account identifier includes two or more member user account identifiers. In step S1.03, the at least one account identifier returned by the server to the terminal may include not only the communication group account identifier, but also the individual user account identifier. In an implementation manner, the server may query a relationship chain of the sharing user according to the account identifier of the sharing user, find an account identifier of a communication group to which the sharing user belongs and/or an account identifier of a friend user of the sharing user, select at least one account identifier from the found communication group account identifier and the friend user account identifier, and return the at least one account identifier to the terminal. In an implementation manner, the server may query customized information of the enterprise user according to the enterprise account identifier. The customized information includes but is not limited to: a dimension such as an age period, a region, an income range of a user to whom the source message is expected to be pushed; expectation of pushing the source message to a user who is a sports fan, a travel enthusiast, a shopping lover, or the like; and the like. The server may select at least one communication group account identifier and/or individual user account identifier meeting the customized information from the Internet application, and return the at least one account identifier to the terminal.

In Step S104: The terminal receives the at least one account identifier that is returned by the server and that is in the Internet application to which the enterprise account identifier belongs.

In Step S105: The terminal selects a determined target account with which the source message is shared from the at least one account identifier.

In steps S104 and S105, the terminal may display the at least one account identifier returned by the server in a form of a list, to provide the at least one account identifier to the sharing user for selection, and obtain the determined target account with which the source message is shared and that is selected by the sharing user. It may be understood that, the target account identifier may be a communication group account identifier, or may be an individual user account identifier.

In Step S106, the server receives the determined target account with which the source message is shared and that is selected by the terminal from the at least one account identifier.

In Step S107, the server sets an electronic resource property for the source message according to a preset rule to generate a target message, the electronic resource property including a total amount of an electronic resource and a number of time of drawing the electronic resource.

The preset rule is used to define a correspondence between the source message and the electronic resource property. The correspondence may be: one source message corresponds to one electronic resource property. In some embodiments, the preset rule may be set according to an actual need, for example, may be set according to a budget configured by the enterprise user, or may be set according to whether the target account identifier belongs to a communication group account identifier or an individual user account identifier. In this step, the server obtains, according to the preset rule, the electronic resource property corresponding to the source message, and sets the electronic resource property for the source message according to a composition structure of the red packet message, so as to generate the target message.

In Step S108, the server sends the target message to a target user corresponding to the target account identifier.

It should be noted that, if the target account identifier is an individual user account identifier, the server sends the target message to a terminal of a target user corresponding to the target account identifier. If the target account identifier is a communication group account identifier, the server first obtains member account identifiers of the communication group according to the communication group account identifier, and then sends the target message to terminals of target users corresponding to the member account identifiers of the communication group.

In Step S109, send a drawing request carrying the password to the server if receiving a drawing operation of the sharing user on the target message.

After the foregoing steps S101 to S108 are performed, the target message that is provided by the enterprise user and that carries the password and the electronic resource property is shared with the target user. If the target user is an individual user, a terminal of the sharing user outputs an independent session window for the sharing user and the target user, and displays the target message that has been shared in the independent session window, and both the sharing user and the target user can initiate a drawing operation by clicking the target message in the independent session window. Similarly, if the target user is a member user of a communication group, a terminal of the sharing user outputs a group chat session window for the communication group, both the sharing user and member users of the communication group can initiate a drawing operation by clicking the target message in the group chat session window. If the drawing operation of the sharing user on the target message is received, the terminal sends the drawing request carrying the password to the server after detecting the drawing operation. In an implementation manner, the terminal may output a message input box in the session window (the independent session window or the group chat session window), and when the sharing user manually types the password into the message input box and confirms sending of the password, the terminal obtains the input password, generates the drawing request carrying the input password, and sends the drawing request to the server. In another implementation manner, the terminal displays the target message in the session window, and when the sharing user clicks the target message and confirms sending of the target message, the terminal obtains the password from the target message, generates the drawing request carrying the obtained password, and sends the drawing request to the server.

Step S110, transfer, according to the electronic resource property, an electronic resource corresponding to an associated account of the enterprise account identifier to an associated account of the sharing user account identifier if receiving a drawing request that is sent by the terminal and that carries the password.

In some embodiments, after receiving the drawing request sent by the terminal and before performing step S110, the server further performs the following step:

In step s22, detect whether the sharing user has a sharing right; and perform step S110 if the sharing user has the sharing right.

If the sharing user has the drawing right, the electronic resource can be drawn according to the target message; or if the sharing user does not have the drawing right, the electronic resource cannot be drawn according to the target message. In actual application, in a process of performing step s22, the server specifically performs the following steps:

In step ss221, verify the password carried in the drawling request.

The server compares the password carried in the drawing request with the target message or the password carried in the source message, and if the former is different front the latter, the verification is a failure, and the server determines that the sharing user does not have the drawing right. In this case, the server may feed drawing failure notification information back to the terminal. If the former is the same as the latter, the verification is successful, and subsequently, steps ss222 and ss223 are performed.

In step ss222, obtain at least one drawing record of the target message according to a request time point of the drawing request if the verification is successful, the drawing record including a drawing time point and a drawing amount of the electronic resource.

In step ss223, determine that the sharing user has the drawing right if a total number of the at least one drawing record does not reach the number of time of drawing the electronic resource included in the electronic resource property, and a sum of a drawing amount at is included in the at least one drawing record does not reach the amount included in the electronic resource property.

In steps ss222 and ss223, if a total number of the at least one drawing record does not reach the number of time of drawing the electronic resource included in the electronic resource property, and a sum of a drawing amount that is included in the at least one drawing record does not reach the amount included in the electronic resource property, it indicates that the electronic resource described by the target message is not completely drawn, and the sharing user has the drawing right, and can draw the corresponding electronic resource according to the target message. On the contrary, if a total number of the at least one drawing record reaches the number of time of drawing the electronic resource included in the electronic resource property, and a sum of a drawing amount that is included in the at least one drawing record reaches the amount included in the electronic resource property, it indicates that the electronic resource described by the target message is completely drawn, and the sharing user does not have the drawing right, and cannot draw the corresponding electronic resource according to the target message. In this case, the server may feed drawing failure, notification information back to the terminal.

After determining that the sharing user has the drawing right, the server may perform step S110, and transfer, according to the electronic resource property, an electronic resource corresponding to an associated account of the enterprise account identifier to an associated account of the sharing user account identifier.

A process of the message processing method of an embodiment of this application is described below in detail by using a specific example.

An enterprise user M releases a source message in a homepage of a bulletin hoard system, and a user a obtains the source message by means of a "shaking" function of an instant messaging application, where the source message carries a password "XX enterprise wishes you a happy new year!", and carries an account identifier of the enterprise user M. A mobile phone displays the source message on a home interface of the instant messaging application. The user a clicks the source message, and the mobile phone sends a sharing request for the source message to a server.

If a request time point of the sharing request is within a sharing validity period of the source message, and/or a number of remaining sharing time is not zero, the server determines that a sharing user has a sharing right, and returns at least one account identifier in the Internet application to the mobile phone.

The mobile phone displays a sharing list, and the sharing list includes the at least one account identifier returned by the server. The user a selects an account identifier of a communication group B from the sharing list as a target account identifier. It is assumed that the communication group B includes a member user a, a member user b, and a member user c. Further, the mobile phone sends the account identifier of the communication group B to the server.

The server sets an electronic resource property for the source message according to a preset rule to generate a target message. It is assumed that the electronic resource property includes: a total amount of an electronic resource is RMB10, a number of time of drawing the electronic resource is 2, and a splitting manner is average splitting. The server sends the target message to the member user a, the member user 13, and the member user c of the communication group B.

The mobile phone displays a group chat session window of the communication group B, and displays the target message in the group chat session window. All member users of the communication group B can click the target message to snatch the electronic resource. It is assumed that the member user a, the member user b, and the member user c all request to draw the electronic resource by manually typing the password or clicking the target message and automatically inputting the password in the group chat session window, the mobile phone generates a drawing request carrying the password according to a drawing operation of the member user and sends the drawing request to the server.

The server verifies whether the password of the user a is correct. If the password of the user a is correct, and before the user a requests drawing, the user b draws the electronic resource once with an amount of RMB5, and the user c draws the electronic resource once with an amount of RMB5, that is, there are drawing records for the target message and a sum of amounts of the two drawing records reaches RMB10, then the user a does not have a drawing right. On the contrary, if before the user a requests drawing, there is no drawing record for the target message, or a number of the drawing record does not reach 2, or a sum of amounts of the drawing records does not reach RMB10, then the user a has the drawing right. The server transfers an electronic resource with an amount of RMB5 in an associated account of the enterprise user M to an associated account of the user a. The mobile phone may output a notification that the electronic resource is already transferred to the associated account of the user a. The user a may query a total amount of the electronic resource in the associated account by means of the mobile phone.

In the message processing method of this embodiment of this application, the server may return, according to a sharing request that is for a source message and that is sent by the terminal, at least one account identifier in an Internet application to the terminal. In addition, the server may set an electronic resource property for the source message according to a preset rule to generate a target message, and send the target message to a target user corresponding to a determined target account identifier with which the source message is shared and that is selected by the terminal. If receiving a drawing request that sent by the terminal and that carries the password, the server can transfer, according to the electronic resource property, an electronic resource corresponding to an associated account of the enterprise account identifier to an associated account of the sharing user account identifier. A red packet message carrying a password is shared, transferred, and the like, so as to effectively improve propagation power of the red packet message and expand a propagation range of the red packet message, thereby implementing interaction between an enterprise user and more individual users, enriching functions of a message processing process, and enabling the message processing process to be more practical and interesting.

Figure 3:
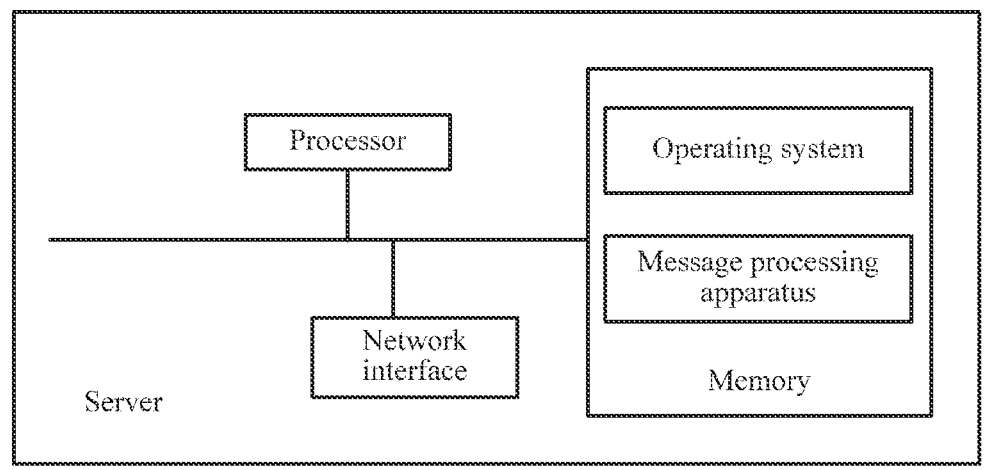
FIG. 3 is a schematic structural diagram of a server according to example embodiments.

Based on the message processing system and the message processing method according to the foregoing embodiments, an embodiment of this application further provides a server. The server may be the server shown in FIG. 1, and may be configured to perform the corresponding steps of the method process shown in FIG. 2A. Referring to FIG. 3, an internal structure of the server may include but is not limited to a processor, a network interface, and a memory. The processor, the network interface, and the memory in the server may be connected through a bus or in another manner. In FIG. 3 of this embodiment of this application, that the processor, the network interface, and the memory in the server are connected through a bus is used an example.

The processor or the central processing unit (CPU) is a calculation core and control core of the server. Optionally, the network interface may include a standard wired interface and a standard wireless interface (such as a WiFi interface or a mobile communications interface). The memory is a memory device the server, and is configured to store programs and data. It may be understood that, the memory herein may be a high-speed random memory (RAM), or may be a non-volatile memory, for example, at least one magnetic disk memory, or may optionally be a storage apparatus located far away from the foregoing processors. The memory provides storage space. An operating system of the server is stored in the storage space. The operating system may include but is not limited to a Windows system (an operating system), a Linux system (an operating system), and the like. This is not limited in this application. A message processing apparatus is further stored in the storage space of the memory.

Figure 4:
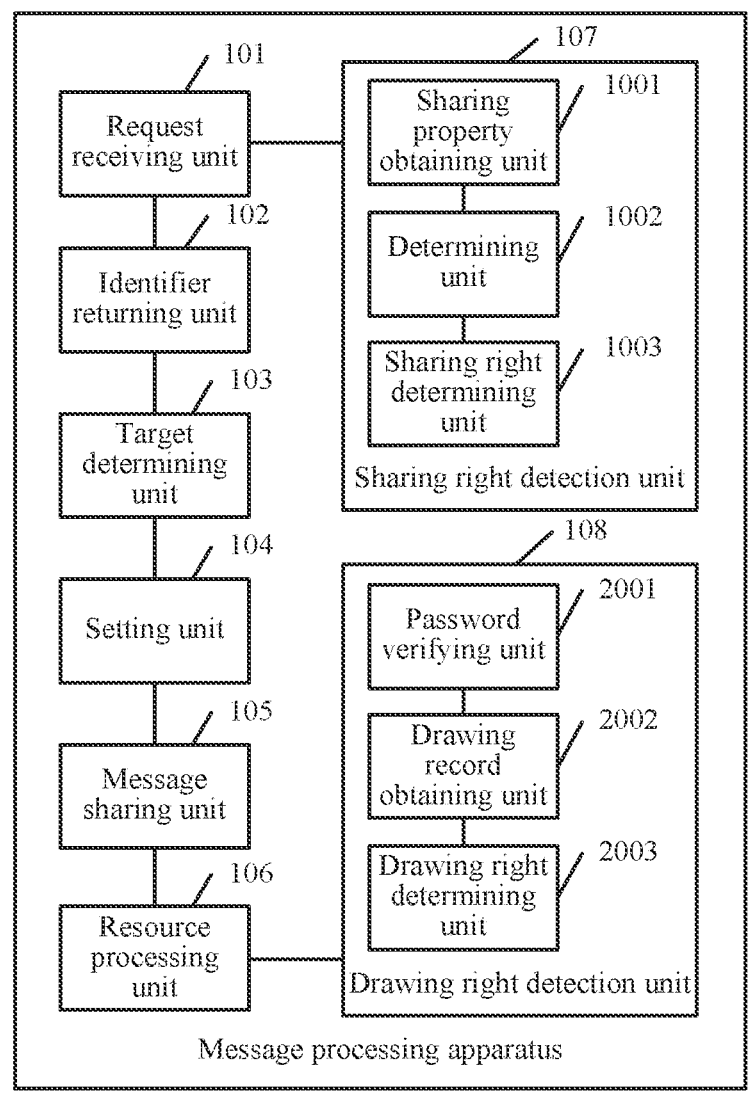
FIG. 4 is a schematic structural diagram of a message processing apparatus according to example embodiments.

In the example embodiments of this application, the server performs the corresponding steps of the method process shown in FIG. 2A by running the message processing apparatus in the memory. Referring to FIG. 4, in a message processing process, the apparatus runs the following units.

A request receiving unit 101, configured to receive a sharing request that is for a source message and sent by a terminal, the source message carrying a password and an enterprise account identifier, and the sharing request including a sharing user account identifier.

An identifier returning unit 102, configured to return at least one account identifier in an Internet application to which the enterprise account identifier belongs to the terminal.

A target determining unit 103, configured to receive a determined target account identifier with which the source message is shared and that is selected by the terminal from the at least one account identifier.

A setting unit 104, configured to set an electronic resource property for the source message according to a preset rule to generate a target message, the electronic resource property including a total amount of an electronic resource and a number of time of drawing the electronic resource.

A message sharing unit 105, configured to send the target message to a target user corresponding to the target account identifier.

A resource processing unit 106, configured to transfer, according to the electronic resource property, an electronic resource corresponding to an associated account of the enterprise account identifier to an associated account of the sharing user account identifier if receiving a drawing request that is sent by the terminal and that carries the password.

In some embodiments, the apparatus further runs the following unit.

A sharing right detection unit 107, configured to: detect whether a sharing user has a sharing right, and notify the identifier returning unit 102 to return the at least one account identifier in the Internet application to which the enterprise account identifier belongs to the terminal if the sharing user has the sharing right.

In a process of running the sharing right detection unit 107, the apparatus specifically runs the following units: a sharing property obtaining unit 1001, configured to obtain a sharing property of the source message, the sharing property including a sharing validity period and/or a number of remaining sharing time; a determining unit 1002, configured to: determine whether a request time point of the sharing request is within the sharing validity period, and/or determine whether the number of remaining sharing tune is not zero; and a sharing right determining unit 1003, configured to: determine that the sharing user has the sharing right if the request time point of the sharing request is within the sharing validity period, and/or the number of remaining sharing time is not zero.

In some example embodiments, the apparatus further runs the following unit: a drawing right detection unit 108, configured to: detect whether the sharing user has a drawing right, and notify the resource processing unit to transfer, according to the electronic resource property, the electronic resource corresponding to the associated account of the enterprise account identifier to the associated account of the sharing user account identifier if the sharing user has the drawing right.

In a process of running the drawing right detection unit 108, the apparatus specifically runs the following units: a password verifying unit 2001, configured to verify the password carried in the drawing request; a drawing record obtaining unit 2002, configured to: obtain at least one drawing record of the target message according to a request time point of the drawing request if the verification is successful, the drawing record including a drawing time point and a drawing amount of the electronic resource: and a drawing right determining unit 2003, configured to determine that the sharing user has the drawing right if a total number of the at least one drawing record does not reach the number of time of drawing the electronic resource included in the electronic resource property, and a sum of a drawing amount that is included in the at least one drawing record does not reach the amount included in the electronic resource property.

According to the server including the message processing apparatus provided in example embodiments of this application, the server may return, according to a sharing request that is for a source message and that is sent by the terminal, at least one account identifier in an Internet application to h terminal. In addition, the server may set an electronic resource property for the source message according to a preset rule to generate a target message, and send the target message to a target user corresponding to a determined target account identifier with which the source message is shared and that is selected by the terminal. If receiving a drawing request that is sent by the terminal and that carries the password, the server can transfer, according to the electronic resource property, an electronic resource corresponding to an associated account of the enterprise account identifier to an associated account of the sharing user account identifier. A red packet message carrying a password is shared, transferred, and the like, so as to effectively improve propagation power of the red packet message and expand a propagation range of the red packet message, thereby implementing interaction between an enterprise user and more individual users, enriching functions of a message processing process, and enabling the message processing process to be more practical, effective, and interesting.

Figure 5:
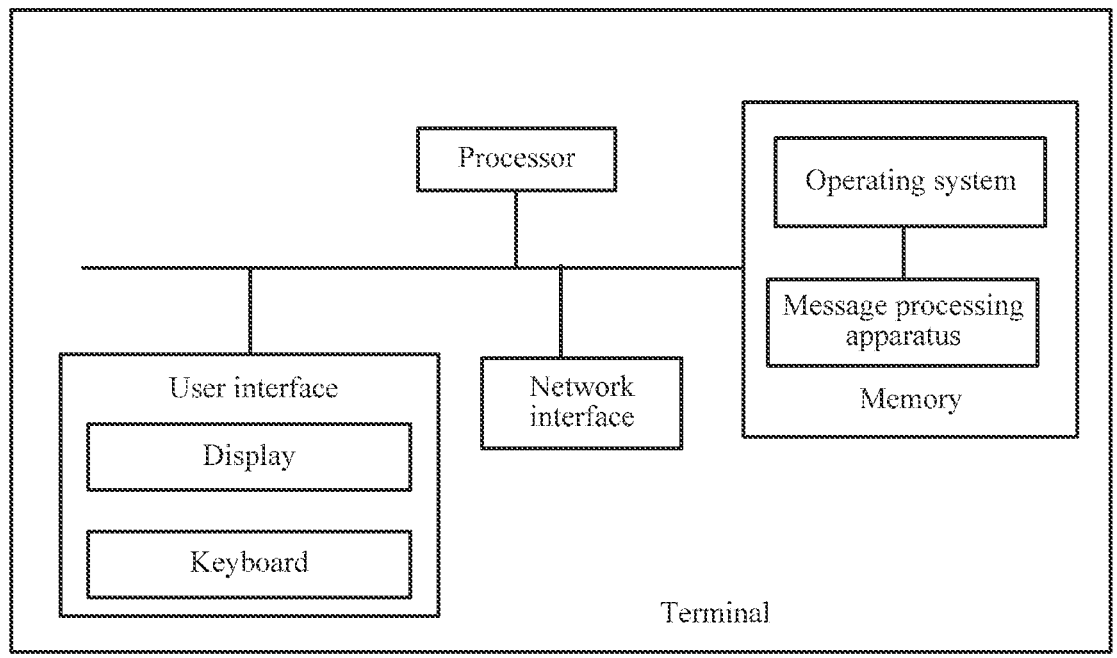
FIG. 5 is a schematic structural diagram of a terminal according to example embodiments.

Based on the message processing system and the message processing method according to the foregoing embodiments, example embodiments of this application further provides a terminal. The terminal may be any terminal shown in FIG. 1, and may be configured to perform the corresponding steps of the method process shown in FIG. 2A. Referring to FIG. 5, an internal structure of the terminal may include but is not limited to a processor, a user interface, a network interface, and a memory. The processor, the user interface, the network interface, and the memory in the terminal may be connected through a bus or in another manner. In FIG. 5 of this embodiment of this application, that the processor, the user interface, the network interface, and the memory in the server are connected through a bus is used an example.

The user interface is a medium implementing interaction and information exchange between a user and the terminal. Specifically, the user interface may include a display used for output, a keyboard used for input, and the like. It should be noted that, the keyboard herein may be an entity keyboard, or may be a touchscreen virtual keyboard, or may further be a keyboard combining an entity keyboard and a touchscreen virtual keyboard. The processor for referred to as CPU) is a calculation core and a control core of the terminal, and can parse various instructions in the terminal and process various types of data of the terminal. For example, the CPU may be configured to parse a turn-on or turn-off instruction sent by the terminal to the user, and control the terminal to perform a turn-on or turn-off operation. For another example, the CPU may transmit various types of interaction data between internal structures of the terminal. The memory is a memory device in the terminal, and is configured to store programs and data. It may be understood that, the memory herein may include a built-in memory of the terminal, and certainly, may also include an expansion memory supported by the terminal. The memory provides storage space. An operating system of the terminal is stored in the storage space. The operating system may include but is not limited to a Windows system (an operating system), an Android system (a mobile operating system), an IOS system (a mobile operating system), and the like. This is not limited in this application. A message processing apparatus is stored in the storage space of the memory. The apparatus may be an application program on the terminal. For example, the apparatus may be an instant messaging application program on the terminal.

In example embodiments of this application, the terminal performs the corresponding steps of the method process shown FIG. 2A by running the message processing apparatus in the memory.

Figure 6:
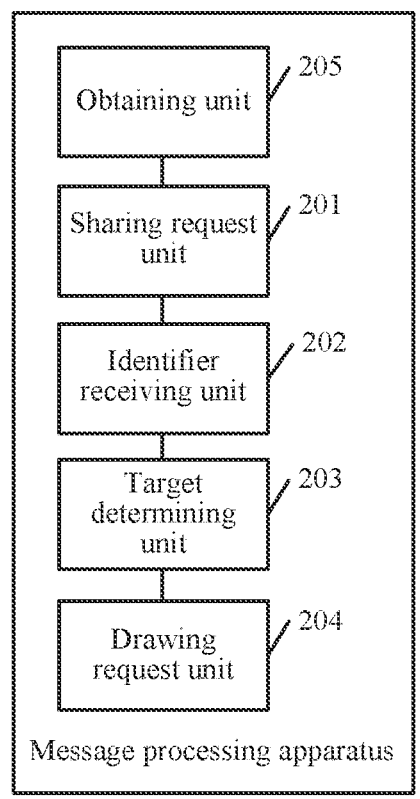
FIG. 6 is a schematic structural diagram of another message processing apparatus according to example embodiments.

Referring FIG. 6, in a message processing process, the apparatus runs the following units: a sharing request unit 201, configured to send a sharing request for a source message to a server when detecting a trigger operation of a sharing user on the source message, the source message carrying a password and an enterprise account identifier, and the sharing request including a sharing user account identifier; an identifier receiving unit 202, configured to receive at least one account identifier that is in an Internet application to which the enterprise account identifier belongs and that is returned by the server; a target determining unit 203, configured to select a determined target account identifier with which the source message is shared from the at least one account identifier, so that the server sets an electronic resource property for the source message according to the preset rule to generate a target message, and sends the target message to a target user corresponding to the target account identifier, the electronic resource property including a total amount of an electronic resource and a number of time of drawing the electronic resource; and a drawing request unit 204, configured to send a drawing request carrying the password to the server if receiving a drawing operation of the sharing user on the target message, so that the server transfers, according to the electronic resource property, an electronic resource corresponding to an associated account of the enterprise account identifier to an associated account of the sharing user account identifier.

In some example embodiments, the apparatus further runs the following unit: an obtaining unit 205, configured to obtain the source message when detecting a two-dimensional barcode scanning event and/or a gravity sensing event.

According to the terminal including the message processing apparatus provided in this embodiment of this application, the terminal may send a sharing request for a source message to the server, receives at least one account identifier that is in an Internet application and that is returned by the server, and selects a determined target account identifier with which the source message is shared from the at least one account identifier, so that the server may set an electronic resource property for the source message according to a preset rule to generate a target message, and send the target message to a target user corresponding to the determined target account identifier with which the source message is shared and that is selected by the terminal. The terminal may send a drawing request carrying a password to the server, so that the server can transfer, according to the electronic resource property, an electronic resource corresponding to an associated account of an enterprise account identifier to an associated account of a sharing user account identifier. A red packet message carrying a password is shared, transferred, and the like, so as to effectively improve propagation power of the red packet message and expand a propagation range of the red packet message, thereby implementing interaction between an enterprise user and more individual users, enriching functions of a message processing process, and enabling the message processing process to be more practical and interesting. A person of ordinary skill in the art may understand that all or some of the processes for implementing the foregoing embodiment methods, any one of the foregoing message processing methods may be performed by s of executable instructions such as computer programs. Specifically, the foregoing methods are implemented by using a computer or a processor to instruct related hardware by means of computer programs. Specifically, the method shown in FIG. 2A may be performed. The programs may be stored in a computer readable storage medium. When the programs are executed, the processes of the embodiments of the foregoing methods may be included. The storage medium may be a magnetic disk, an optical disc, a read-only memory (ROM), a random access memory (RAM), or the like. Optionally, the computer storage medium may be a non-transitory storage medium.

The disclosure above is merely the preferred embodiments of this application, and certainly cannot be used to limit the right scope of this application. It should be understood that any modifications according to the principle of this application shall fall within the protection scope of this application.

What is claimed is:

1. A message processing method, comprising:
receiving, from a terminal, a sharing request including a sharing user account identifier and a source message, the source message including a first password and an enterprise account identifier;
detecting whether a sharing user has a sharing right;
based on determining that the sharing user has the sharing right, returning, to the terminal, at least one account identifier in an Internet application to which the enterprise account identifier belongs;
receiving a determined target account identifier to which the source message is shared, the source message being selected at the terminal from the at least one account identifier;
setting an electronic resource property for the source message based on a preset rule to generate a target message;
sending the target message to a target user corresponding to the target account identifier, the electronic resource property comprising a total amount of an electronic resource and a number of drawings from the electronic resource, wherein the number of drawings comprises at least two drawings; and
transferring, based on the electronic resource property, an electronic resource corresponding to an associated account of the enterprise account identifier to an associated account of the sharing user account identifier in response to receiving a drawing request including a second password automatically entered from a group chat session window of the terminal,
wherein the electronic resource is transferred based on the second password matching the first password.

2. The method according to claim 1, wherein the detecting whether the sharing user has the sharing right comprises:
obtaining a sharing property of the source message, the sharing property comprising a sharing validity period and/or a number of remaining sharing time;
determining whether a request time point of the sharing request is within the sharing validity period, and/or determining whether the number of remaining sharing time is not zero; and
determining that the sharing user has the sharing right if the request time point of the sharing request is within the sharing validity period, and/or the number of remaining sharing time is not zero.

3. The method according to claim 1, wherein after the receiving the drawing request including the second password from the terminal, the method further comprises:
detecting whether the sharing user has a drawing right; and
transferring, based on the electronic resource property, the electronic resource corresponding to the associated account of the enterprise account identifier to the associated account of the sharing user account identifier in response to the sharing user having the drawing right.

4. The method according to claim 3, wherein the detecting whether the sharing user has the drawing right comprises:
verifying the second password carried in the drawing request;
obtaining drawing record of the target message based on a request time point of the drawing request in response to the verification being successful, the drawing record comprising a drawing time point and a drawing amount of the electronic resource; and
determining that the sharing user has the drawing right if a total number of the drawing record does not reach the number of drawings from the electronic resource based on the electronic resource property, and if a sum of the drawing amount in the drawing record does not reach the amount based on the electronic resource property.

5. A message processing method, comprising:
sending, by a terminal, a sharing request for a source message to a server when detecting a trigger operation of a sharing user on the source message, the source message including a first password and an enterprise account identifier, and the sharing request comprising a sharing user account identifier;
based on the server determining that a sharing user has a sharing right, receiving at least one account identifier from the server and that is in an Internet application to which the enterprise account identifier belongs;
selecting a determined target account identifier to which the source message is shared from the at least one account identifier to allow the server to set an electronic resource property for the source message according to the preset rule to generate a target message, and send the target message to a target user corresponding to the target account identifier, the electronic resource property comprising a total amount of an electronic resource and a number of drawings from the electronic resource, wherein the number of drawings comprises at least two drawings; and
sending a drawing request including a second password automatically entered from a group chat session window of the terminal to the server
based on the second password matching the first password, receiving an electronic resource corresponding to an associated account of the enterprise account identifier and an associated account of the sharing user account identifier based on the electronic resource property.

6. The method according to claim 5, wherein before the sending the sharing request for the source message to the server when detecting the trigger operation of the sharing user on the source message, the method further comprises:
obtaining the source message when detecting a two-dimensional barcode scanning event and/or a gravity sensing event.

7. A message processing apparatus, comprising:
at least one memory configured to store computer program code;
at least one processor configured to access said memory and operate according to said computer program code, said computer program code including:
request receiving code configured to cause at least one of said at least one processor to receive, from a terminal, a sharing request including a sharing user account identifier and a source message, the source message including a first password and an enterprise account identifier;
sharing right detection code configured to cause at least one of said at least one processor to detect whether a sharing user has a sharing right;
identifier returning code configured to cause at least one of said at least one processor to, based on the sharing right detection code determining that the sharing user has the sharing right, return at least one account identifier in an Internet application to which the enterprise account identifier belongs to the terminal;

target determining code configured to cause at least one of said at least one processor to receive a determined target account identifier with which the source message is shared, the source message being selected at the terminal from the at least one account identifier;

setting code configured to cause at least one of said at least one processor to set an electronic resource property for the source message according to a preset rule to generate a target message, the electronic resource property comprising a total amount of an electronic resource and a number of drawings from the electronic resource, wherein the number of drawings comprises at least two drawings;

message sharing code configured to cause at least one of said at least one processor to send the target message to a target user corresponding to the target account identifier;

resource processing code configured to cause at least one of said at least one processor to transfer, based on the electronic resource property, an electronic resource corresponding to an associated account of the enterprise account identifier to an associated account of the sharing user account identifier if receiving a drawing request including a second password automatically entered from a group chat session window of the terminal, wherein the electronic resource is transferred based on the second password matching the first password.

8. The apparatus according to claim 7, wherein the sharing right detection code comprises:

sharing property obtaining code configured to cause at least one of said at least one processor to obtain a sharing property of the source message, the sharing property comprising a sharing validity period and/or a number of remaining sharing time;

determining code configured to cause at least one of said at least one processor to: determine whether a request time point of the sharing request is within the sharing validity period, and/or determine whether the number of remaining sharing time is not zero; and sharing right determining code configured to cause at least one of said at least one processor to: determine that the sharing user has the sharing right if the request time point of the sharing request is within the sharing validity period, and/or the number of remaining sharing time is not zero.

9. The apparatus according to claim 7, said computer program code further comprising:

drawing right detection code configured to cause at least one of said at least one processor to: detect whether the sharing user has a drawing right, and notify at least one of said processor to transfer, according to the electronic resource property, the electronic resource corresponding to the associated account of the enterprise account identifier to the associated account of the sharing user account identifier if the sharing user has the drawing right.

10. The apparatus according to claim 9, wherein the drawing right detection code comprises:

password verifying code configured to cause at least one of said at least one processor to verify the second password in the drawing request;

drawing record obtaining code configured to cause at least one of said at least one processor to: obtain at least one drawing record of the target message according to a request time point of the drawing request if the verification is successful, the drawing record comprising a drawing time point and a drawing amount of the electronic resource; and drawing right determining code configured to cause at least one of said at least one processor to: determine that the sharing user has the drawing right if a total number of the at least one drawing record does not reach the number of drawings from the electronic resource based on the electronic resource property, and if a sum of the drawing amount in the at least one drawing record does not reach the amount based on the electronic resource property.

11. A message processing apparatus, comprising:

at least one memory configured to store computer program code;

at least one processor configured to access said memory and operate according to said computer program code, said computer program code including:

sharing request code configured to cause at least one of said at least one processor to send, by a terminal, a sharing request for a source message to a server when detecting a trigger operation of a sharing user on the source message, the source message including a first password and an enterprise account identifier, and the sharing request comprising a sharing user account identifier;

identifier receiving code configured to cause at least one of said at least one processor to, based on the server determining that a sharing user has a sharing right, receive at least one account identifier that is in an Internet application to which the enterprise account identifier belongs and that is returned by the server;

target determining code configured to cause at least one of said at least one processor to select a determined target account identifier with which the source message is shared from the at least one account identifier, so that the server sets an electronic resource property for the source message according to the preset rule to generate a target message, and sends the target message to a target user corresponding to the target account identifier, the electronic resource property comprising a total amount of an electronic resource and a number of drawings from the electronic resource, wherein the number of drawings comprises at least two drawings;

drawing request code configured to cause at least one of said at least one processor to:

send a drawing request including a second password automatically entered from a group chat session window of the terminal to the server, and based on the second password matching the first password, receiving an electronic resource corresponding to an associated account of the enterprise account identifier and an associated account of the sharing user account identifier based on the electronic resource property.

12. The apparatus according to claim 11, further comprising:

obtaining code configured to cause at least one of said at least one processor to obtain the source message when detecting a two-dimensional barcode scanning event and/or a gravity sensing event.

13. A message processing system, comprising a server and at least one terminal, the server comprising the message processing apparatus according to claim 7.

14. A non-transitory computer readable storage medium, computer executable instructions being stored in the computer readable storage medium, and the computer executable instructions being used to perform at least one of the message processing method according to claim 1.

15. The non-transitory computer readable storage medium according to claim 14, wherein the method further comprises:
  detecting whether a sharing user has a sharing right; and
  returning the at least one account identifier in the Internet application to which the enterprise account identifier belongs to the terminal if the sharing user has the sharing right.

16. The non-transitory computer readable storage medium according to claim 15, wherein the detecting whether the sharing user has the sharing right comprises:
  obtaining a sharing property of the source message, the sharing property comprising a sharing validity period and/or a number of remaining sharing time;
  determining whether a request time point of the sharing request is within the sharing validity period, and/or determining whether the number of remaining sharing time is not zero; and
  determining that the sharing user has the sharing right if the request time point of the sharing request is within the sharing validity period, and/or the number of remaining sharing time is not zero.

17. The non-transitory computer readable storage medium according to claim 14, wherein the method further comprises:
  detecting whether the sharing user has a drawing right; and
  transferring, based on the electronic resource property, an electronic resource corresponding to the associated account of the enterprise account identifier to the associated account of the sharing user account identifier in response to the sharing user having the drawing right.

18. The non-transitory computer readable storage medium according to claim 17, wherein the detecting whether the sharing user has the drawing right comprises:
  verifying the second password in the drawing request;
  obtaining drawing record of the target message based on a request time point of the drawing request in response to in response to the verification is successful, the drawing record comprising a drawing time point and a drawing amount of the electronic resource; and
  determining that the sharing user has the drawing right if a total number of the drawing record does not reach the number of drawings from the electronic resource based on the electronic resource property, and if a sum of a drawing amount in the drawing record does not reach the amount based on the electronic resource property.

\* \* \* \* \*